United States Patent
Guo et al.

(10) Patent No.: US 10,938,736 B2
(45) Date of Patent: Mar. 2, 2021

(54) DYNAMIC ALLOCATION OF EDGE COMPUTING RESOURCES IN EDGE COMPUTING CENTERS

(71) Applicant: Futurewei Technologies, Inc., Plano, TX (US)

(72) Inventors: Hui Guo, San Jose, CA (US); Hang Shi, Fremont, CA (US); Yinghua Ye, Los Gatos, CA (US)

(73) Assignee: Futurewei Technologies, Inc., Plano, TX (US)

( * ) Notice: Subject to any disclaimer, the term of this patent is extended or adjusted under 35 U.S.C. 154(b) by 231 days.

(21) Appl. No.: 15/787,203

(22) Filed: Oct. 18, 2017

(65) Prior Publication Data

US 2019/0116128 A1    Apr. 18, 2019

(51) Int. Cl.
*H04L 12/923* (2013.01)
*H04L 29/08* (2006.01)

(52) U.S. Cl.
CPC ........ *H04L 47/762* (2013.01); *H04L 67/1008* (2013.01); *H04L 67/1021* (2013.01)

(58) Field of Classification Search
CPC .............. H04L 47/762; H04L 67/1008; H04L 67/1021; H04L 12/24; H04L 29/08; H04L 12/923; H04L 67/101; H04L 67/322
See application file for complete search history.

(56) References Cited

U.S. PATENT DOCUMENTS

| 2011/0126244 | A1 | 5/2011 | Hasek |
| 2012/0303818 | A1* | 11/2012 | Thibeault ............. G06F 9/5072 709/226 |
| 2014/0122698 | A1* | 5/2014 | Batrouni ............ H04L 67/2833 709/224 |
| 2014/0122725 | A1 | 5/2014 | Batrouni et al. |
| 2014/0344873 | A1 | 11/2014 | Rieger et al. |

(Continued)

FOREIGN PATENT DOCUMENTS

| CN | 104756444 A | 7/2015 |
| CN | 106254408 A | 12/2016 |

(Continued)

OTHER PUBLICATIONS

Machine Translation and Abstract of Chinese Publication No. CN107241577, Oct. 10, 2017, 15 pages.

(Continued)

*Primary Examiner* — Benjamin M Thieu
(74) *Attorney, Agent, or Firm* — Conley Rose, P.C.

(57) ABSTRACT

According to one aspect of the present disclosure, there is provided a computer-implemented method for dynamically allocating edge computing resources. The method can include receiving, in an edge computing center, a request for using the edge computing resources to perform a secondary task for a secondary edge service, allocating the edge computing resources to the secondary edge service if the edge computing resources are available, and in response to an increase in a primary edge services workload, reallocating at least a portion of the edge computing resources from the secondary edge service to the primary edge services if the edge computing resources are insufficient for performing the primary edge services.

20 Claims, 6 Drawing Sheets

(56) References Cited

U.S. PATENT DOCUMENTS

| | | | | |
|---|---|---|---|---|
| 2016/0127216 A1* | 5/2016 | Amokrane | .......... | H04L 43/0882 |
| | | | | 398/25 |
| 2016/0366244 A1 | 12/2016 | Chiu et al. | | |
| 2017/0264493 A1* | 9/2017 | Cencini | ................ | G06F 9/5083 |
| 2018/0024869 A1* | 1/2018 | John | ..................... | G06F 9/5066 |
| | | | | 718/105 |
| 2018/0089002 A1* | 3/2018 | Xia | ....................... | G06F 9/5094 |

FOREIGN PATENT DOCUMENTS

| | | | |
|---|---|---|---|
| CN | 106358245 A | * | 1/2017 |
| CN | 107018534 A | | 8/2017 |
| CN | 107241577 A | | 10/2017 |
| EP | 3410773 A1 | | 12/2018 |

OTHER PUBLICATIONS

Foreign Communication From a Counterpart Application, PCT Application No. PCT/CN2018/110611, English Translation of International Search Report dated Jan. 16, 2019, 5 pages.

Foreign Communication From a Counterpart Application, PCT Application No. PCT/CN2018/110611, English Translation of Written Opinion dated Jan. 16, 2019, 4 pages.

\* cited by examiner

DYNAMIC ALLOCATION OF EDGE COMPUTING RESOURCES IN EDGE COMPUTING CENTERS

BACKGROUND

Edge computing centers can be deployed at edges of a communication network such that computing resources can be available in close proximity to end users. In this way, the edge computing centers can be employed to support computation-intensive and latency-sensitive applications at user equipment having limited resources. However, workloads of edge computing centers can fluctuate from time to time. During off-peak periods, computing resources in edge computing centers may be underused.

SUMMARY

According to one aspect of the present disclosure, there is provided a computer-implemented method for dynamically allocating edge computing resources. The method can include receiving, in an edge computing center, a request for using the edge computing resources to perform a secondary task for a secondary edge service, allocating the edge computing resources to the secondary edge service if the edge computing resources are available, and in response to an increase in a primary edge services workload, reallocating at least a portion of the edge computing resources from the secondary edge service to the primary edge services if the edge computing resources are insufficient for performing the primary edge services.

Optionally, in an embodiment, detecting the increase in the primary edge services workload comprises receiving a message indicating the primary edge services workload has exceeded a workload threshold. Optionally, in any of the preceding aspects, the method can further include monitoring the primary edge services workload of the edge computing resources, and providing information about the primary edge services workload to a task scheduler. Optionally, in any of the preceding aspects, the method can further include providing edge context information of the edge computing center to a task scheduler.

Optionally, in any of the preceding aspects, reallocating at least a portion of the edge computing resources from the secondary edge service to the primary edge services can include one of aborting the secondary edge service, suspending the secondary edge service, reducing a number of virtual machines provisioned for the secondary service, or reducing a number of servers assigned for the secondary edge service. Optionally, in any of the preceding aspects, the edge computing resources in the edge computing center can include a server, a container, a virtual machine, a main processor, a network, or a data storage.

According to another aspect of the disclosure, there is provided a computer-implemented method for dynamically allocating off-peak edge computing resources in a plurality of edge computing centers. The method can include receiving, at a global resource manager from the plurality of edge computing centers, a primary edge services workload of edge computing resources being used for primary tasks, determining, based on the primary edge services workload, workload patterns of the edge computing resources indicating when the edge computing resources are in an off-peak state, and scheduling secondary tasks according to the workload patterns, wherein the secondary tasks are matched to off-peak edge computing resources in respective edge computing centers indicated by the workload patterns.

Optionally, embodiments of the method can further include receiving edge context information from the plurality of edge computing centers, and scheduling the secondary tasks according to edge contexts of the respective edge computing centers. The edge contexts can specify one or more of edge computing resource configurations of respective edge computing centers, edge computing center location information, and/or primary edge services supported at respective edge computing centers. Optionally, in any of the preceding aspects, the method can further include scheduling the secondary tasks according to user subscription information. Optionally, in any of the preceding aspects, the method can further include detecting a first edge computing resource in a first edge computing center is in the off-peak state based on the primary edge services workload of the first edge computing resource.

Optionally, in any of the preceding aspects, the method can further include partitioning a secondary task into sub-tasks such that the sub-tasks can fit in off-peak time slots indicated by the workload patterns of the edge computing resources, and generating a final result of the secondary task based on results of the sub-tasks. Optionally, in any of the preceding aspects, the method can further include filtering out a secondary task that cannot fit in off-peak time slots indicated by the workload patterns of the edge computing resources. Optionally, in any of the preceding aspects, the method can further include rescheduling a secondary task when the secondary task is rejected or aborted at an edge computing center. Optionally, in any of the preceding aspects, the edge computing resources can include at least one of a server, a container, a virtual machine, a main processor, a network, or a data storage.

According to a further aspect of the disclosure, there is provided a non-transitory computer-readable medium storing computer instructions that, when executed by one or more processors, cause the one or more processors to perform the method for dynamically allocating off-peak edge computing resources in a plurality of edge computing centers.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Aspects of this disclosure describe systems and methods for dynamically allocating edge computing resources of a plurality of edge computing centers. For example, the plurality of edge computing centers can be deployed to provide primary edge services (PESs) for latency sensitive applications of user equipment (UE). However, in order to minimize underutilizing the edge computing resources, a task scheduler can monitor a workload status of the plurality of edge computing centers to determine PES workload patterns of the edge computing resources in each of the edge computing centers. The task scheduler can intelligently schedule non-real time secondary tasks based on the PES workload patterns, as well as edge computing center context information and user subscription information, to take advantage of available edge computing resources. For example, when demands from UEs are high during peak periods, the edge computing resources can be dedicated to providing PESs to end users. Conversely, underused edge computing resources during off-peak periods can be allocated to provide secondary edge services (SESs) for performing non-real time secondary tasks as requested by the task scheduler.

In addition, while an edge computing center is executing secondary tasks, the edge computing center can restrict SESs to yield edge computing resources to PESs when unanticipated PES workload arises. For example, SESs can be suspended or aborted, or resources assigned for the SES may be downscaled. As a result, quality of service (QoS) of the PESs towards end users can be guaranteed. In this way, edge computing resources can be dynamically allocated between PESs and SESs, without disturbing delivery of PESs. Further, the above dynamic allocation of edge computing resources between PES and SES can be performed in a self-driven manner such that scheduling decisions and resource reallocation decisions can be made automatically to adapt to varying PES demands for edge computing resources.

Figure 1:
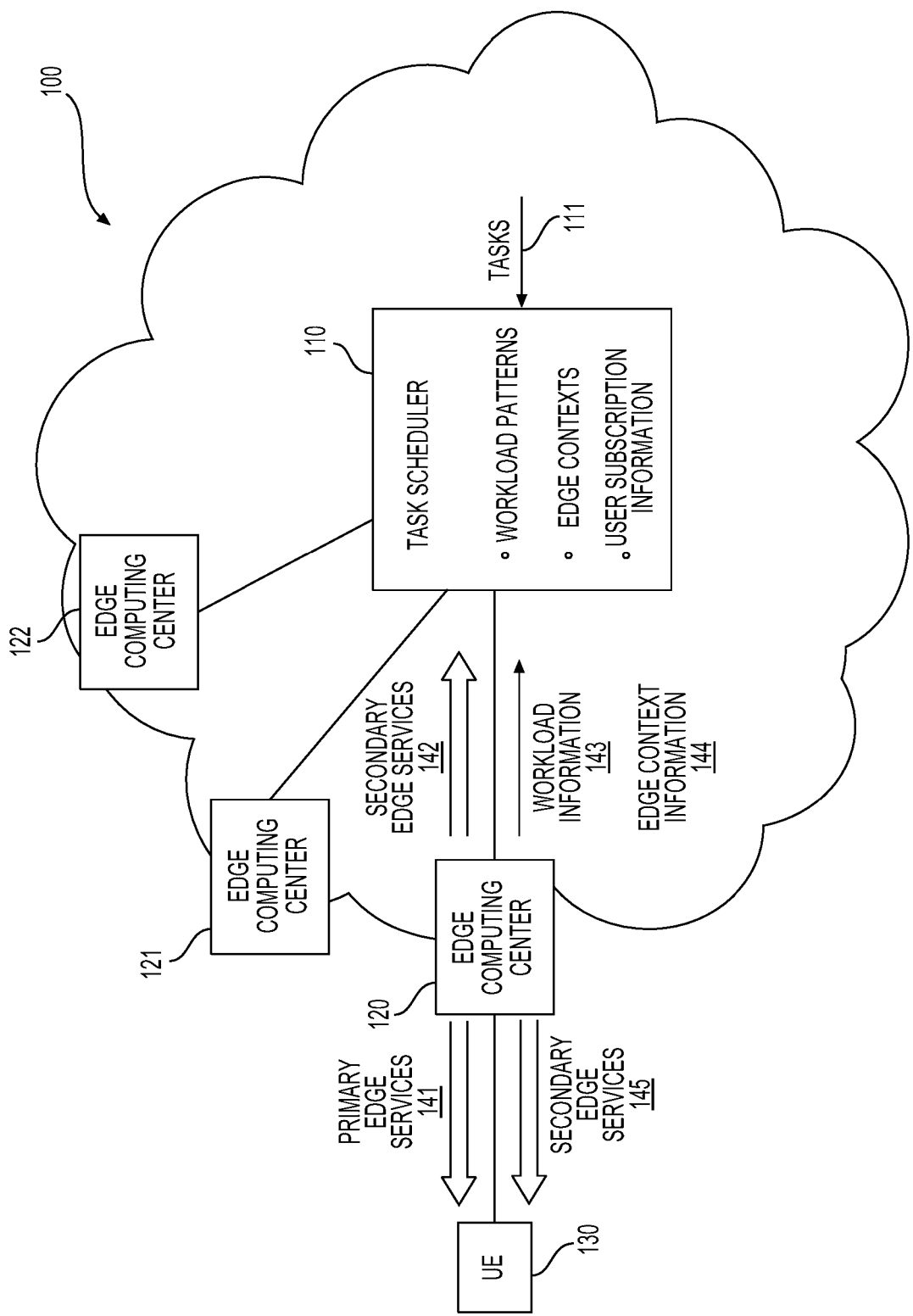
FIG. 1 shows an exemplary communication network according to an embodiment of the disclosure.

FIG. 1 shows an exemplary communication network 100 according to an embodiment of the disclosure. The communication network 100 can include edge computing centers 120-122 that are deployed at edges of the communication network 100, and a task scheduler 110 coupled to the edge computing centers 120-122 as shown in FIG. 1. Primary edge service workloads of the edge computing centers 120-122 can vary from time to time, resulting in peaks and valleys in workload variations. The task scheduler 110 can allocate off-peak edge computing resources in the edge computing centers 120-122 to diverse secondary tasks to improve resource utilization efficiency, without disturbing the edge computing centers 120-122 executing intended primary tasks.

In one example, the network 100 is a wireless network, such as a long term evolution (LTE) network in conformance with LTE communication standards developed by the 3rd Generation Partnership Project (3GPP). In other examples, the network 100 can be a combination of different types of networks, such as the Internet, wireless networks, wired networks, and the like. The network 100 can be configured to provide services to a plurality of end users or UEs. End user and UE are used interchangeably in this detailed description.

The edge computing centers 120-122 can each be configured with various computing resources, referred to as edge computing resources. Edge computing resources can include servers, storages, networks, containers, virtual machines, main processors, software platforms, application programs, data bases, and the like. In one example, a main processor can be a central processing unit (CPU), a graphics processing unit (GPU), or a processing unit based on field programmable gate array (FPGA), application specific integrated circuit (ASIC), or other technologies. The edge computing centers 120-122 can be positioned in close proximity to end users of the network 100, such that responses to user requests can be provided with low latency. In one example, the edge computing center 120 is collocated with a base station of a wireless network, such as an eNodeB base station in an LTE network, and requests for data center services can be off-loaded to the collocated edge computing center 120 from the base station instead of being transmitted to a remote data center. Accordingly, a UE, such as UE 130, within the coverage of the base station can be served by the edge computing center 120. Compared with receiving cloud computing services from a remote data center, similar cloud computing services based on edge computing resources can be provided to end users with less delay. Also, off-loading data center service traffics to edge computing centers can save backbone bandwidths of the network 100. In an alternative example, the edge computing center 120 is located in a branch office of a telecom operator. In other examples, the edge computing center 120 can be collocated with, or combined with, a base station of a micro-cell, a macro-cell, or an aggregated cell.

The edge computing centers 120-122 can provide primary edge services 141 to a plurality of UEs. In one example, the UEs can be mobile devices, such as a mobile phone, a laptop computer, a vehicle carried device, and the like. In other examples, the UEs can be non-mobile devices fixed at geographic locations, such as various types of sensors of Internet of Thing (IoT) applications (utility meters, appliances, surveillance cameras, and the like). Those non-mobile devices can communicate to the communication network 100 and the edge computing centers 120-122 via wireless or wired channels.

The primary edge services provided by the edge computing centers 120-122 to the UEs can be services for latency sensitive and/or computation intensive applications. Examples of typical latency sensitive and/or computation intensive applications can include face recognition, augmented reality (AR), connected vehicle, online gaming, and the like. Requirements of response delays for different latency sensitive applications can vary depending on QoS defined for respective applications. For example, the response delays can be within a range from 0.5 ms to several seconds.

The edge computing centers 120-122 can also provide secondary edge services 142 for performing tasks scheduled by the task scheduler 110 when computing resources in the edge computing centers 120-122 are in off-peak state. The tasks scheduled by the task scheduler 110 can be latency tolerant tasks. Examples of typical latency tolerant tasks scheduled by the task scheduler 110 can include billing processing, non-real time analytics, offline testing and verifications from telecom operators or over the top (OTT) vendors, bitcoin mining, scientific calculation, and the like. For example, those latency tolerant tasks can be completed within hours or days before a deadline.

According to an aspect of the disclosure, the edge computing centers 120-122 can be configured to prioritize latency sensitive services provided to UEs over latency tolerant services as requested by the task scheduler 110, and allocate edge computing resources accordingly. For example, when edge computing resources in an edge computing center are in off-peak state, the underused edge computing resources can be allocated for performing tasks scheduled by the task scheduler 110. However, when requests from end users arrives, and there are no sufficient edge computer resources available in this edge computing center, the edge computing center resources can be reallocated from the tasks scheduled by the task scheduler 110 to the newly arrived end-user requests. In this way, QoS towards UEs can be guaranteed while off-peak computing resources can be used for additional tasks.

Therefore, latency sensitive services provided to UEs are referred to as primary edge services (PESs) 141 while latency tolerant services provided for tasks scheduled by the task scheduler 110 are referred to as secondary edge services (SESs) 142. For example, as shown in FIG. 1, the edge computing center 120 provides PESs 141 to the UE 130, and SESs 142 to tasks scheduled by the task scheduler 110. Accordingly, tasks initiated by UEs corresponding to latency sensitive services are referred to as primary tasks while tasks scheduled by the task scheduler 110 corresponding to latency tolerant services are referred to as secondary tasks.

It is noted that some latency tolerant services provided to UEs by the edge computing centers 120-122 can also be categorized as SESs, and treated with low priority compared with PESs. For example, in utility metering applications, a metering data collection process is not latency sensitive, and can be performed during off-peak periods of the edge computing centers 120-122. A metering data collection process can also be paused or aborted if edge computing resources are to be reallocated to a PES. Accordingly, in one example, the edge computing center 120 can also provide SESs 145 to the UE 130 as shown in FIG. 1.

To facilitate scheduling of secondary tasks, in one example, the edge computing centers 120-122 are each configured to collect workload information and provide the workload information to the task scheduler 110. For example, as shown in FIG. 1, the edge computing center 120 provides workload information 143 to the task scheduler 110. The workload information can reflect real time utilization status of various computing resources such as a main processor, memory, bandwidth, storage, and the like, in an edge computing center. The workloads of various computing resources can be measured and represented based on various metrics. For example, a CPU utilization rate can be used to indicate a workload of a CPU, and a memory usage rate can be used to indicate a workload of a memory. In addition, the workload information distinguishes workloads of PESs and SESs, such that PES workload information can be provided to the task scheduler 110. Based on the PES workload information, PES workload patterns over a long-term period of time can be derived for each computing resource. Based on the PES workload patterns, when and which computing resource is in off-peak state can be identified and predicted. In one example, the workload information of each edge computing center 120-122 can be substantially periodically transmitted to the task scheduler 110, and can reflect real time workload status of each edge computing center 120-122.

To facilitate scheduling of secondary tasks, in one example, the edge computing centers 120-122 can each be configured to collect edge context information and provide the edge context information to the task scheduler 110. For example, as shown in FIG. 1, the edge computing center 120 provides edge context information 144 to the task scheduler 110. The edge context information can reflect resource configuration status of each edge computing center 120-122, such as what resources (hardware and software) are deployed in a specific edge computing center, capability and/or capacity of each deployed resource, and the like. In addition, the edge context information can include edge computing center location information, and/or primary edge services (such as augmented reality (AR), virtual reality (VR), vehicle to everything (V2X), IoT, and the like) supported at respective edge computing centers. Based on the edge context information, what types of edge computing resources are available in a specific edge computing center can be known. In one example, when edge computing resource configuration changes in an edge computing center, the respective edge computing center can update the task scheduler 110 by transmitting a message of edge context information to the task scheduler 110.

In one example, the task scheduler 110 is configured to schedule secondary tasks among the edge computing centers 120-122 based on PES workload patterns and edge contexts of the edge computing centers 120-122. For example, the task scheduler 110 can receive workload information and edge context information from the edge computing centers 120-122, and accordingly determine PES workload patterns and maintain edge contexts corresponding to each edge computing centers 120-122. Based on the PES workload patterns and the edge contexts, which edge computing resources in which edge computing center are in off-peak state during which time slots can be known. Based on global knowledge of underused edge computing resources in the edge computing centers 120-122, the task scheduler 110 can match received tasks 111 to available edge computing resources during different time slots in different edge computing centers.

In addition, the task scheduler 110 can adaptively change schedules of secondary tasks according to real time workload status of the edge computing centers 120-122. In one example, a real time workload status of an edge computing center at a given time may contradict workload patterns of the edge computing center due to presence of an unexpected PES workload. As a result, an edge computing resource supposed to be available according to a workload pattern may become unavailable at the beginning of or during an off-peak time slot of this edge computing resource. Accordingly, the task scheduler 110 can reschedule affected tasks in response to the real time workload status. In another example, when a task is aborted at an edge computing center in order to yield edge computing resources to arrival of unexpected PES requests, the task scheduler 110 can correspondingly reschedule the aborted task. Further, in some examples, the task scheduler 110 can schedule tasks according to user subscription information.

While three edge computing centers 120-122 are shown in the FIG. 1 example, it is to be understood that the network 100 can include any number of edge computing centers that function in a way similar to the edge computing centers 120-122 in terms of allocation or reallocation of underused edge computing resources, and the task scheduler 110 can accordingly cooperate with any number of edge computing centers in a way as described in this detailed description. Therefore, schemes and techniques described herein can be applied to any number of edge computing centers.

Figure 2:
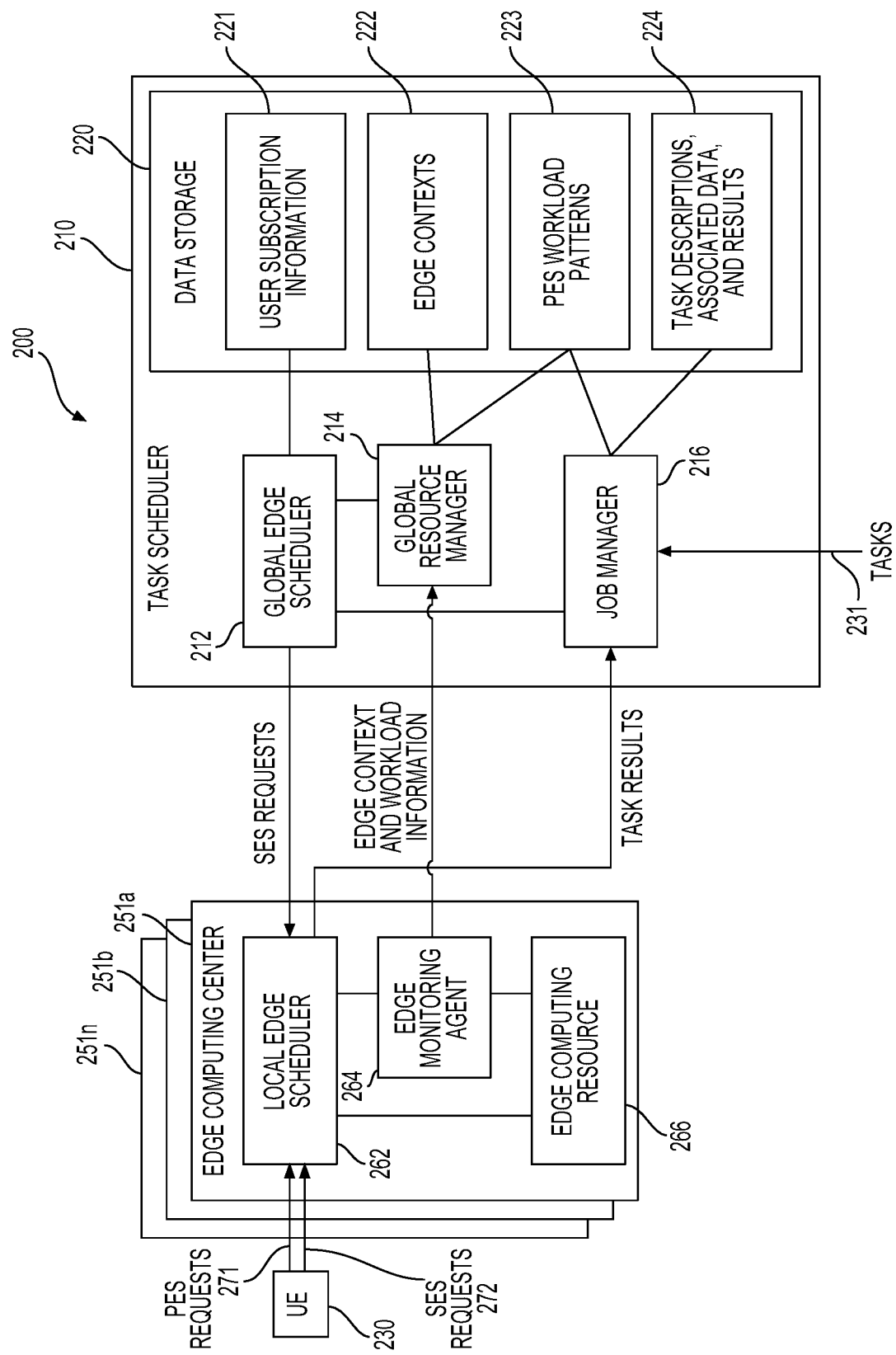
FIG. 2 shows a system for dynamic allocation of edge computing resources according to an embodiment of the disclosure.

FIG. 2 shows a system 200 for dynamic allocation of edge computing resources according to an embodiment of the disclosure. The system can include a plurality of edge computing centers 251a-251n, and a task scheduler 210. The task scheduler 210 can cooperate with the plurality of edge computing centers 251a-251n to dynamically utilize edge computing resources without disturbing delivery of PESs.

In an example, the task scheduler 210 includes a global edge scheduler 212, a global resource manger 214, a job manager 216, and a data storage 220. The data storage 220 can store user subscription information 221, edge contexts 222, PES workload patterns 223, and task descriptions, associated data, and results 224. Those components are coupled together as shown in FIG. 1.

The job manager 216 can receive tasks 231 and store the tasks 231 into the data storage 220. For example, script-based task scheduling utilities, such as crontabs, Oozie, VB scripts, and the like, can be used to receive the tasks 231. Alternatively, specifically developed software tools for task scheduling can be used. The submitted tasks 231 are intended to be executed in batch mode (offline mode) leveraging off-peak edge computing resources. When storing a task into the data storage 220, the job manager 216 may create a task description 224 including a set of parameters describing characteristics of the task. The parameters can include requirements of edge computing resources, execution time length, deadline, priority, and the like. Characteristics of received tasks can be later used for scheduling operations. In addition, when receiving a task, data associated with the task 224 may also be received and subsequently stored in the data storage 220. The data associated with the task 224 can include source data to be processed, specific programs for processing the source data, binary images for installing on virtual machines, and/or a container for installing on a bare metal server, or other associated data necessary for executing the task. In alternative examples, part of the data associated with the task 224 may be stored in locations separate from the task scheduler 210, and can be acquired during execution of the task.

The job manager 216 can also be configured to partition a heavy task into smaller light tasks such that the resultant light sub-tasks can fit in off-peak time slots indicated by PES workload patterns 223 of the plurality of edge computing centers 251a-251n. For example, the job manager 216 can consider lengths of different time slots as well as available resources corresponding to each time slot, and accordingly split a heavy task into light sub-tasks. Depending on properties of heavy tasks, resultant sub-tasks may be dependent on each other. For example, an order of executing the related sub-tasks may be required. However, in other examples, no dependency exists among sub-tasks that can be processed in parallel. The job manager 216 can receive task results (including results of sub-tasks) from the plurality of edge computing centers 251a-251n and store the task results into the data storage 220. For tasks partitioned into parallel-processed sub-tasks, the job manager 216 can merge results of those parallel-processed sub-tasks to generate a final result.

In addition, the job manager 216 can be configured to, with consideration of partitioning a heavy task, filter out tasks that cannot fit in off-peak time slots of edge computing centers, and reject those tasks. Qualified tasks can subsequently be provided to the global edge scheduler 212. For example, a list of task or sub-task identities may be transmitted to the global edge scheduler 212.

The global resource manger 214 can be configured to continuously receive edge context information and workload information from the plurality of edge computing centers 251a-251n, and build global knowledge of edge contexts 222 and PES workload patterns 223. The global resource manager 214 can maintain contexts of each of the plurality of edge computing centers 251a-251n based on context updating information received from the respective edge computing centers.

In addition, in one example, the global resource manager 214 can receive PES workload information of the plurality of edge computing centers 251a-251n, and derive PES workload patterns of each edge computing centers 251a-251n. Specifically, derivation of PES workload patterns can be based on historical PES workload information accumulated during an observation window that may last, for example, several weeks, months or years. Accordingly, a PES workload pattern can correspond to a specific computing resource (a server, a network, a storage, or the like) in an edge computing center, and indicate periodically occurred off-peak time slots when this specific computing resource is in off-peak state and is underused by PESs.

In one example, an off-peak state of an edge computing resource is defined based on a threshold of utilization rate. When a utilization rate of the edge computing resource is below the threshold of utilization rate, the edge computing resource is said to be in off-peak state. During an observation window, a series of time slots when the edge computing resource is in off-peak state can be observed. Based on the series of time slots, an off-peak time slot having a periodicity may be determined for the edge computing resource. For example, a server in an edge computing data center may be fully occupied by PESs during the day while off-peak during the night. Accordingly, an off-peak time slot of this server may appear regularly during nights. Other off-peak time slots of different edge computing resources may have periodicity associated with weekdays or weekends, holidays or working days, and the like.

In addition, the global edge resource manager 214 can be further configured to detect whether an edge computing resource is in off-peak state based on received real time workload information, and inform the global edge scheduler 212 when an edge computing resource is in off-peak state. For example, the global edge resource manager 214 can inspect real time workload information corresponding to this edge computing resource to determine if the edge computing resource is in off-peak state, for example, based on certain thresholds. The global edge resource manger 214 can subsequently inform the global edge scheduler 212 that the edge computing resource is in off-peak state, which can potentially trigger a task dispatch process related with this edge computing resource. A time window for inspection of the real time workload status may be defined, so that a stable workload status of the edge computing resource can be acquired before informing the global edge scheduler 212.

Further, in one example, the global edge resource manager 214 can detect whether a real time workload status of an edge computing resource (such as a server) is in conformance with a PES workload pattern of this edge computing resource, and inform the global edge scheduler 212 of the detection result. In alternative examples, the above real time workload status inspection functions may be performed by the global edge scheduler 212 based on real time workload information forwarded by the global resource manager 214.

In one example, the global edge scheduler 212 is configured to schedule tasks (including sub-tasks) according to edge contexts 222, PES workload patterns 223, and task descriptions 224. For example, the global edge scheduler 212 can receive task identities of the tasks from the job manager 216, and accordingly acquire task descriptions from the data storage 220. The global edge scheduler 212 can also acquire edge contexts 222 and PES workload patterns 223 of the plurality of edge computing centers 251a-251n. The task descriptions can indicate requirements of edge resources, deadlines, priorities, and the like, of the tasks. The edge contexts 222 can describe edge computing resources configured in each edge computing center 251a-251n. The PES workload patterns 223 can indicate off-peak time slots of the various edge computing resources distributed in the plurality of edge computing centers 251a-251n. Based on the task descriptions 224, the edge contexts 222, and the PES workload patterns 223, the global edge scheduler 212 can match tasks to available edge computing resources in specific time slots and in specific edge computing centers.

In one example, the global edge scheduler 212 schedules tasks according to deadlines and priorities of the tasks. For example, a task with a higher priority can be scheduled with an early execution time and/or a larger overprovisioned resource capacity. In one example, a task requires multiple pieces of edge computing resources. Accordingly, the task is fit in a time slot when all associated edge computing resources are available. In one example, sub-tasks of a heavy task are distributed to multiple edge computing centers such that the sub-tasks can be processed in parallel. In one example, secondary tasks are matched with idle edge computing resources on which no primary tasks are performed. For example, secondary tasks and primary tasks are arranged separately on different servers, different containers, different virtual machines, or different networks. In one example, secondary tasks are scheduled in a way that secondary tasks and primary tasks share a same edge computing resource, such as a same server, a same virtual machine, or a same network.

In one example, the global edge scheduler 212 can schedule tasks according to user subscription information 221. The user subscription information 221 of a user can include user identity, services subscribed by the user, parameters related with each subscribed service. Additionally, the user subscription information 221 may include a location of a non-mobile device, a current location of a mobile device, for example, obtained from a home subscriber server (HSS) of a telecommunication operator. In one example, the global edge scheduler 212 can schedule a software update task using user subscription information 221. For example, based on the user subscription information 221, locations of subscribers and product types of the to-be-updated software can be known. Accordingly, the global edge scheduler 212 can dispatch the task to edge computing centers that are close to users who have subscribed to the software update service.

In one example, the global edge scheduler 212 can dispatch a task according to a signal from the global resource manager 214 that indicates whether an edge computing resource required by the task is in off-peak state. In one example, when current workload statuses of all pieces of edge computing resources required for a task are conformant with respective workload patterns, the global edge scheduler 212 can dispatch the task to a respective edge computing center. For example, the global edge scheduler 212 can send a request for a SES for performing the task to the respective edge computing center. In contrast, when workload statuses of some required edge computing resources are not consistent with respective workload patterns, the global edge scheduler 212 can reschedule the task to match the task to other available off-peak time slots. The rescheduling operation may involve rearrangement of multiple tasks.

In one example, a request for a SES for performing a secondary task may be rejected by an edge computing center due to increasing of unexpected PES requests at the moment. In a further example, a request for performing a secondary task can be accepted by an edge computing center. However, due to presence of unexpected PES requests while the secondary task being executed, the secondary task can be aborted. The global edge scheduler 212 can accordingly perform a reschedule operation in response to reception of a rejection, or abortion message. The rejected or aborted task can be rearranged into other suitable off-peak time slots.

The edge computing center 251a can include a local edge scheduler 262, an edge monitoring agent 264, and edge computing resources 266 in one example. The edge computing resources 266 can include various computing resources, such as servers, storages, networks, operating system software, application software, data base systems, and the like. Some servers can be configured to host multiple virtual machines, for example, by using hypervisor software.

The edge monitoring agent 264 can be configured to monitor workload status of the edge computing resources 266, and provide workload information to the local edge scheduler 262 and the global resource manager 214 at the task scheduler 210. For example, each edge computing resource may be configured with a usage monitor that can collect and process usage and performance data to generate real time workload information based on various usage metrics. For example, a network usage monitor may generate information of an amount of traffic along a network connection or in a switch. A server usage monitor may generate information reflecting workload of a server or a virtual machine. The information may include main processor utilization rate, memory utilization rate, number of provisioned virtual machines, network performance, disk performance, and the like, in either host server level or virtual machine level. The usage monitors can communicate with the edge monitoring agent 264 and provide obtained workload information to the edge monitoring agent 264. Alternatively, the usage monitors can store the obtained workload information into a log database and the edge monitoring agent 264 can subsequently retrieve the workload information from the log database.

The edge monitoring agent 264 can be configured to provide PES workload information to the global resource manger 214. For example, part of the workload information obtained by the usage monitors can be PES specific and reflect PES workload on respective edge computing resources. For example, the network usage monitor can distinguish between traffics associated with a PES or a SES. The server usage monitor can distinguish between virtual machines or containers allocated to a PES or a SES. When a server, a container, or virtual machine is shared by a PES and a SES, a server usage monitor can distinguish between usages of a PES or a SES in application level. Based on PES specific usage data, PES workload information can be obtained for different edge computing resources.

The local edge scheduler 262 can be configured to receive PES requests 271 for performing primary tasks initiated by UEs (such as a UE 230), and match the primary tasks to related edge computing resources 266. The local edge scheduler 262 can be further configured to receive SES requests for performing secondary tasks from the global edge scheduler 212. However, the edge scheduler 262 can accept or reject a SES request depending on whether edge computing resources associated with the SES are available or not. For example, as a response to reception of a SES request for performing a secondary task, the local edge scheduler 262 can consult the edge monitoring agent 264 to check whether edge computing resources required by the secondary task (as indicated by the SES request) are underused by PESs. While the secondary task can be scheduled according to workload patterns of edge computing resources at the edge computing center 251a, a burst of PES requests may abruptly change workload status of related edge computing resources from underused to fully occupied. As a response to detection of required edge computing resources being occupied, the local edge scheduler 262 can reject the SES request. Otherwise, the local edge scheduler 262 can accept the SES request, and assign underused edge computing resources to the secondary task.

The local edge scheduler 262 can also be configured to receive SES requests 272 for performing secondary tasks initiated by UEs, such as the UE 230. In one example, the UE 230 can be configured to issue SES requests with two modes. In a first mode, the UE 230 can submit secondary tasks to the job manager 216 in the remote global task scheduler 210. In a second mode, the UE 230 can include a UE task scheduler for managing SESs. For example, the UE task scheduler can be a stripped-down version of the task scheduler 210 and include a job manager for managing secondary tasks, and a scheduler for scheduling and issuing the SES requests 272.

The local edge scheduler 262 can be further configured to restrict a secondary task to yield edge computing resources to primary tasks while the edge computing resources 266 are being share between PESs and SESs. In this way, sufficient edge computing resources can be allocated to PESs to ensure QoS of primary tasks. For example, the edge monitoring agent 264 can detect that a PES requires additional edge computing resources that are not currently available in the edge computing center 251a, and inform the local edge scheduler 262. As a response, the local edge scheduler 262 can suspend or abort one or more secondary tasks to yield edge computing resources. Alternatively, the local edge scheduler 262 can reduce a number of virtual machines, containers, or servers assigned for secondary tasks to yield edge computing resources.

The edge computing centers 251b-251n can have similar functions as the edge computing center 251a. For example, each of the edge computing centers 251b-251n can include a local edge scheduler and an edge monitoring agent that perform functions similar to the local edge scheduler 262 and the edge monitoring agent 264. However, each of the edge computing centers 251a-251n can be configured with different edge computing resources. For example, the edge computing centers 251a-251n may be configured with different numbers of servers that may have different capabilities.

Figure 3:
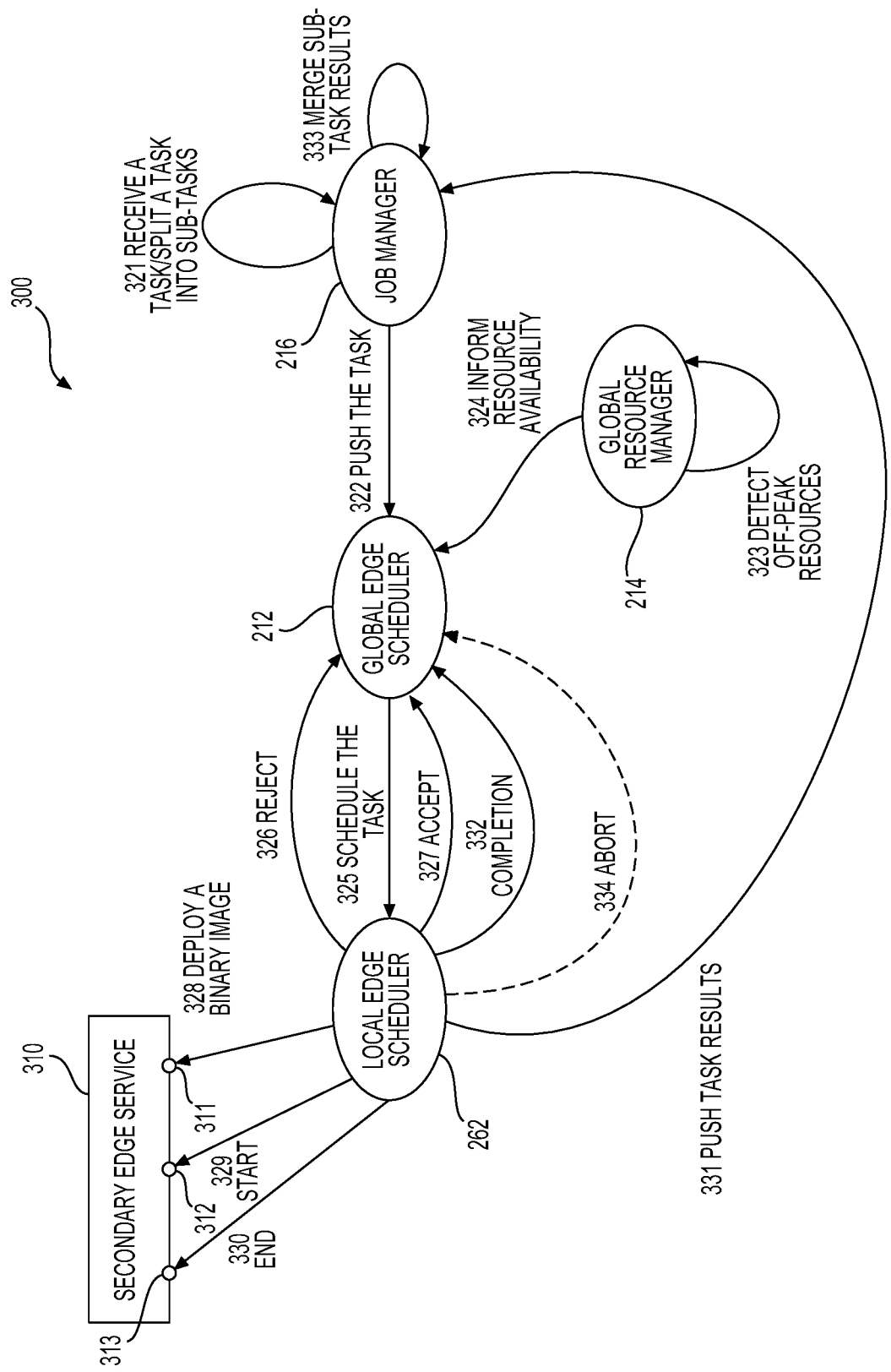
FIG. 3 shows an exemplary process for performing a secondary task using off-peak edge computing resources according to an embodiment of the disclosure.

FIG. 3 shows an exemplary process 300 for performing a secondary task using off-peak edge computing resources according to an embodiment of the disclosure. The process 300 can be performed in the system 200.

At step 321, the job manager 216 can receive a task. In one example, the job manager 216 consults the PES workload patterns 223 in the data storage 220, and accordingly splits the task into smaller sub-tasks such that the sub-tasks can fit in off-peak time slots indicated by the PES workload patterns 223. At step 322, the job manager 216 can push the task (or the sub-tasks) to the global edge scheduler 212, for example, by providing an identity of the task.

At step 323, the global resource manager 214 can detect off-peak edge computing resources, for example, according to real time workload information received from an edge computing center, such as the edge computing center 251a. At step 324, the global resource manager 214 can inform the global edge scheduler 212 that off-peak edge computing resources for performing the task are available at the edge computing center 251a. The global resource manager 214 may inspect whether a resource availability of an edge computing resource is in conformance with a workload pattern of the edge computing resource.

At step 325, the global edge scheduler 212 can schedule the task to the edge computing center 251a in response to receiving a resource availability message from the global resource manager 214. In one example, the task may require one or more edge computing resources at the edge computing center 251a. When all the required edge computing resources are available, the global edge scheduler 212 can dispatch the task to the edge computing center 251a.

At step 326, the local edge scheduler 262 may reject a request for performing the task from the global edge scheduler 212. For example, a burst of PES requests at the edge computing center 251a may change workload status of edge computing resources required by the task. The local edge scheduler 262 may check availability of the required edge computing resources before accepting the task, and accordingly reject the task. Alternatively, at step 327, the local edge scheduler 262 can send a message to acknowledge that the task has been accepted, for example, after checking the resource availability.

At step 328, a binary image can be deployed on a virtual machine provisioned on a server at the edge computing center 251a as triggered by the local edge scheduler 262. In an alternative example, the binary image can include a container, and accordingly be deployed on a bare metal server. In one example, the binary image is prepared by an owner of the task, and provides a computing environment for execution of the task. In an alternative example, the binary image is part of edge computing resources configured at the edge computing center 251a. In other examples, deployment of a binary image may be skipped, for example, when a computing environment is active and available at the edge computing center 251a.

In one example, a life cycle 310 of an SES for performing the task is configured to include several phases 311-313 as shown in FIG. 3. When the SES is stopped during an intermediate phase due to bursts of PES requests, the SES can be reactivated from this intermediate phase instead of starting from a first phase. In this way, overhead of reactivation of the SES can be reduced when edge computing resources later become available. As an example, the step 328 can correspond to a first phase 311 of the life cycle 310 of the SES.

At step 329, the SES for performing the task can be initiated, which can correspond to a second phase 312 of the life cycle 310 of the SES. At step 330, the SES for performing the task can be ended after the task is completed, which can correspond to a third phase 313 of the life cycle 310 of the SES. In alternative examples, a SES can be partitioned in a way different from the life cycle 310, and can accordingly include different number of phases.

At step 331, the local edge scheduler 262 can provide results of the task to the job manager 216. At step 332, the local edge scheduler 262 can transmit a task completion message to the global edge scheduler 212. At step 333, in the example that the task is partitioned into multiple sub-tasks, the job manager 216 can merge sub-task results to generate a final result. The sub-tasks can be dispatched to multiple edge computing centers, and accordingly, the sub-task results can be collected from the multiple edge computing centers.

At step 334, in an alternative example, the local edge scheduler 262 can abort the task and transmit a message to inform the global edge scheduler 212. For example, while the task is being performed, an increase of PES workload may arise demanding edge computing resources allocated to the task. Accordingly, the edge monitoring agent 264 can detect the increase, and inform the local edge scheduler 262 that can subsequently signal the edge computing resource 266 to abort the task.

Figure 4:
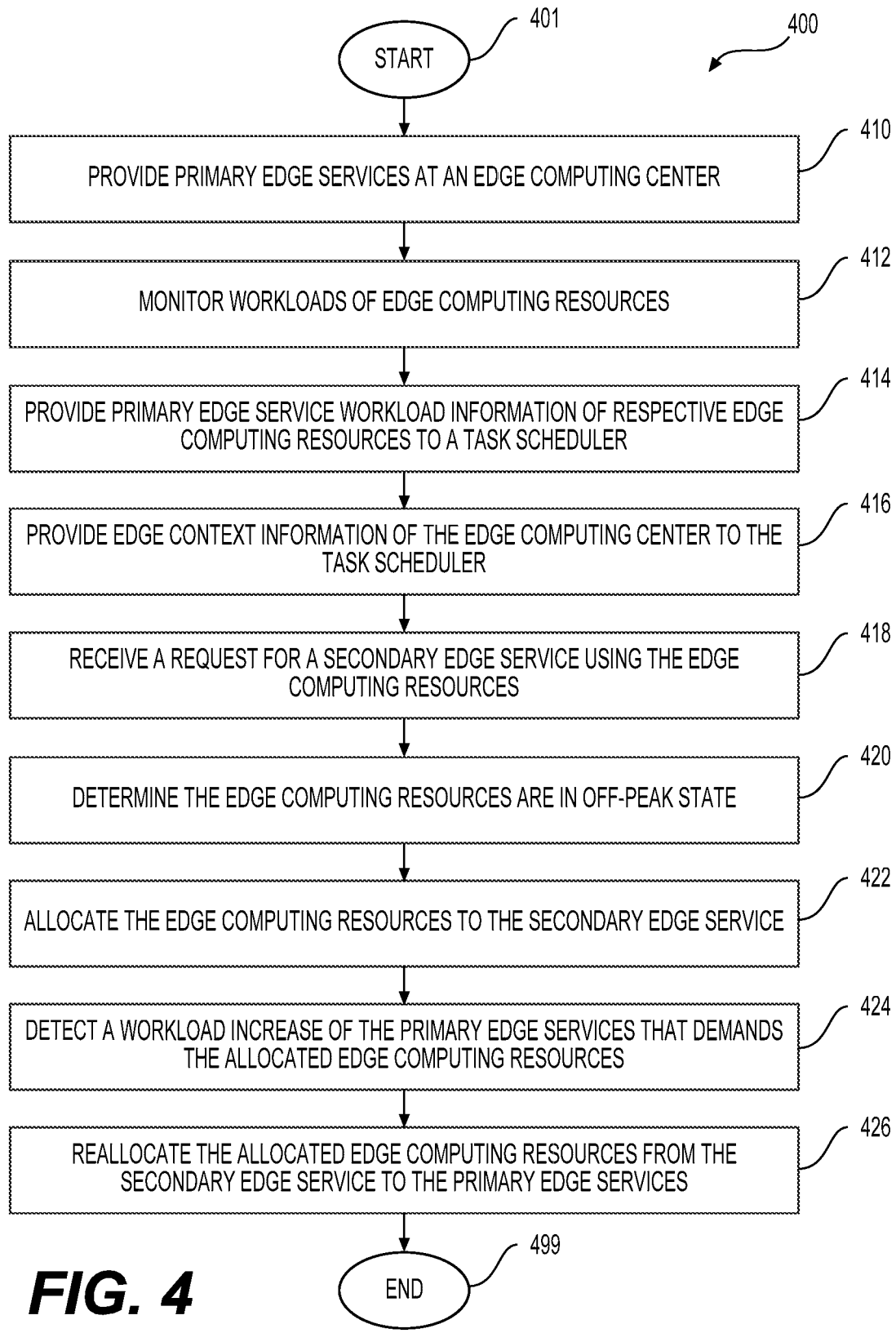
FIG. 4 shows an exemplary process for allocating edge computing resources in an edge computing center between PESs and SESs according to an embodiment of the disclosure.

FIG. 4 shows an exemplary process 400 for dynamically allocating edge computing resources in an edge computing center between PESs and SESs according to an embodiment of the disclosure. The edge computing center 251a in the FIG. 2 example is used as an example to explain the process 400. The process 400 can start from 401 and proceed to 410.

At 410, a set of PESs can be provided to a plurality of UEs using the edge computing resources at the edge computing center 251a. For example, the edge computing resources can include a server that is configured with a CPU and a memory. The server can be configured with a hypervisor and accordingly host one or more virtual machines. The edge computing resources can additionally include other resources, such as a software defined virtual network connecting the server to other components in the edge computing center 251a, a data storage storing data related with the set of primary edge services, and other suitable resources supporting the set of PESs.

At 412, workloads of the edge computing resources can be monitored by the edge monitoring agent 264. As amount of requests for the set of PESs can fluctuate, PES workloads on each edge computing resource can have valleys and peaks from time to time. The edge monitoring agent 264 can substantially continuously collect PES workload information. At 414, the PES workload information of respective edge computing resources can be substantially periodically provided from the edge monitoring agent 264 to the task scheduler 210. At 416, edge context information of the data center 251a can be provided to the task scheduler 210 by the edge monitoring agent 264.

At 418, a request for a SES using the edge computing resources can be received at the local edge scheduler 262. For example, the global edge scheduler 212 can derive PES workload patterns of the edge computing resources based on the historical PES workload information provided at 414. The PES workload patterns can predict off-peak time slots of respective edge computing resources. Accordingly, a secondary task can be matched to off-peak time slots of the edge computing resources and dispatched to the edge computing center 251a. The request can specify that the edge computing resources are allocated for the requested SES during the respective off-peak time slots.

At 420, whether the edge computing resources are in an off-peak state can be determined. For example, a burst of unexpected PES requests can change the edge computing resources from off-peak state to peak state, which can contradict the PES workload patterns of the edge computing resources. Therefore, the local edge scheduler 262 can be configured to consult the edge monitoring agent 264 to determine a current state of the edge computing resources after reception of the request for the SES. When the edge computing resources are not available at the moment, the local edge scheduler 262 can reject the request.

At 422, the edge computing resources can be allocated to the requested SES in response to determination at the 420 that the edge computing resources are in off-peak state. For example, the server may host two virtual machines being used for the set of PESs. The remaining resources of the server can be assigned to two additional virtual machines provisioned for providing the requested SES.

At 424, a workload increase of the PESs can be detected. For example, while the server is being used for the SES, the edge monitoring agent 264 can receive a message from a server usage monitor at the server that workloads of the two virtual machines assigned for the set of PESs have increased to above a threshold. The edge monitoring agent 264 can accordingly inform the local edge scheduler 262 the workload increase of the PESs. The workload increase above the threshold can indicate additional resources of the server are needed for performing the increased PESs.

At 426, the edge computing resources allocated to the SES can be reallocated to the PESs. For example, as the resources of the server have been fully occupied and no resources are available for the increased PESs, the local edge scheduler 262 can cause the server to terminate one of the two virtual machines assigned for the PES, and provision a new virtual machine for the set of PESs using resources previously occupied by the terminated virtual machine. The process 400 can proceed to 499 and terminate at 499.

Figure 5:
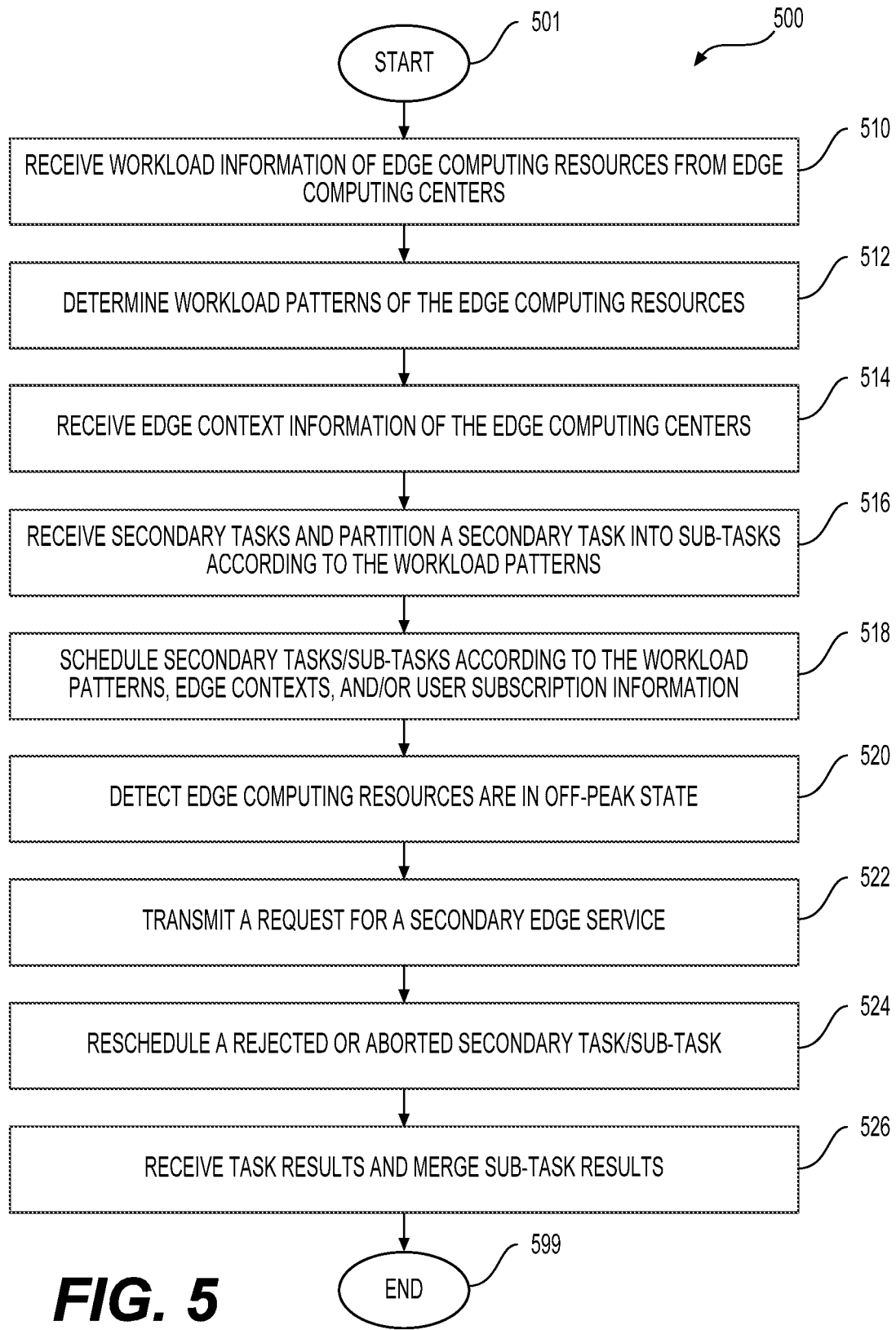
FIG. 5 shows an exemplary process for allocating off-peak edge computing resources in a plurality of edge computing centers according to an embodiment of the disclosure.

FIG. 5 shows an exemplary process 500 for dynamically allocating off-peak edge computing resources in a plurality of edge computing centers according to an embodiment of the disclosure. The task scheduler 210 in the FIG. 2 example is used as an example to explain the process 500. The process 500 can start from 501 and proceed to 510.

At 510, PES workload information of edge computing resources can be received at the global resource manager 214 from the plurality of edge computing centers. At 512, workload patterns of the edge computing resources can be determined by the global resource manager 214 based on historical PES workload information of the edge computing resources. Each workload pattern of a respective edge computing resource indicates off-peak time slots of the respective edge computing resource. At 514, edge context information of each of the plurality of the edge computing centers can be received at the global resource manager 214 that creates or updates edge contexts for respective edge computing centers accordingly.

At 516, secondary tasks can be received at the job manager 216. Optionally, a heavy secondary task can be partitioned into smaller sub-tasks according to the workload patterns determined at 512 such that the sub-tasks can fit in off-peak time slots indicated by the workload patterns. At 518, the secondary tasks (or sub-tasks) can be scheduled according to the workload patterns, edge contexts, and/or user subscription information. Specifically, the secondary tasks (or sub tasks) can be matched to off-peak time slots of respective edge computing resources.

At 520, edge computing resources can be detected to be in off-peak state by the global resource manager 214 based on the PES workload information received at the 510. The global resource manager 214 can accordingly inform the global edge scheduler 212 that respective edge computing resources are available. At 522, a request for a SES for performing a secondary task or sub-task can be transmitted from the global edge scheduler 212 to the local edge scheduler 262. For example, edge computing resources required by performing the secondary task or sub-task are detected to be available by the global resource manager 214. Accordingly, the request for the SES can be transmitted.

At 524, a rejected or aborted secondary task (or sub-task) can be rescheduled by the global edge scheduler 212 as a response to reception of a message from the local edge scheduler 262 that the secondary task (or sub-task) has been rejected or aborted. At 526, task results can be received from the local edge scheduler 262 at the job manager 216. In addition, the job manager 216 may receive sub-task results from multiple edge computing centers and merge the sub-task results to generate a final result for the respective secondary task. The process 500 can proceed to 599 and terminates at 599.

While for purposes of simplicity of explanation, the processes 400 and 500 are shown and described as a series of steps, it is to be understood that, in various embodiments, the steps may occur in different orders and/or concurrently with other steps from what is described above. Moreover, not all illustrated steps may be required to implement the processes 400 or 500 described above.

Figure 6:
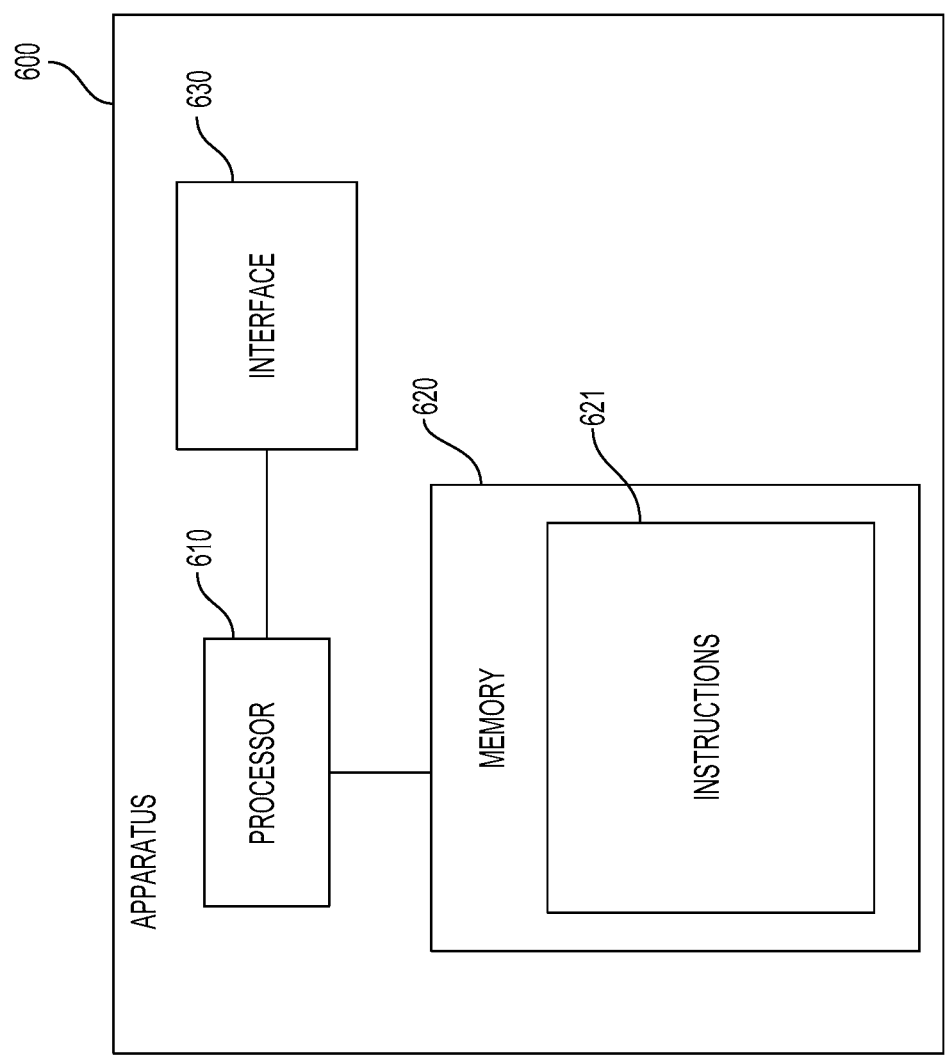
FIG. 6 shows an exemplary apparatus according to embodiments of the disclosure.

FIG. 6 shows an exemplary apparatus 600 according to embodiments of the disclosure. The apparatus 600 can provide means for implementation of techniques, processes, functions, components, systems described herein. For example, the apparatus 600 can be used to implement functions of the global edge scheduler 212, the global resource manager 214, the job manager 216, the local edge scheduler 262, and/or the edge monitoring agent 264. For example, the apparatus 600 can be used to implement the processes 400 or 500. The apparatus 600 can be a general purpose computer in some embodiments, and can be a device including specially designed circuits to implements various functions, components, or processes described herein.

The apparatus 600 can include a processor 610, a memory 620, and an interface 630 in some examples. In a first example, the processor 610 can include circuitry configured to perform the functions of dynamically allocating edge computing resources described herein in combination with software or without software. For example, the processor 610 can include circuits configured to perform functions of the local edge scheduler 262 and the edge monitoring agent 264, and to perform all or a portion of the steps of the process 400. Alternatively, the processor 610 can include circuits configured to perform the functions of the global edge scheduler 212, the global resource manager 214, and/or the job manager 216, and/or to perform all or a portion of the steps of the process 500. In various examples, the processor 610 can be a digital signal processor (DSP), an application specific integrated circuit (ASIC), programmable logic devices (PLDs), field programmable gate arrays (FPGAs), digitally enhanced circuits, or comparable device or a combination thereof.

In a second example, the processor 610 can be a central processing unit (CPU) configured to execute instructions to perform various functions and processes described herein. Accordingly, the memory 620 can be configured to store instructions 621 to be executed by the processor 610. When executed by the processor 610, the instructions 621 can implement any of the embodiments herein. For example, when executed by the processor 610, the instructions 621 can cause the apparatus 600 to perform operations including dynamically allocating edge computing resources. In one example, the processor 610, when executing the instructions 621, can perform the functions of the components in the edge computing centers 251a-251n, or perform the steps of the processes 400. In another example, the processor 610, when executing the instructions for dynamically allocating edge computing resources, can perform the functions of the components in the task scheduler 210, or perform the steps of the processes 500. The memory 620 can further store other instructions or data, such as operating systems, application programs, and the like. The memory 620 can include a read only memory (ROM), a random access memory (RAM), a flash memory, a solid state memory, a hard disk drive, an optical disk drive, or the like.

The interface 630 in some embodiments comprises a network interface. The interface 630 can be configured to provide communication channels for the processor 610 to communicate with one or more computer networks, and other devices connected to the one or more computer networks. For example, the interface 630 can include circuits for processing signals according to various communication protocols, such as Ethernet, IP/TCP, Wi-Fi, and the like. In addition, or alternatively, the interface 630 in some embodiments comprises a user interface that handles user inputs and generates outputs to the user, including generating outputs to output devices. The apparatus 600 can optionally include other components, such as input and output devices, additional CPU or signal processing circuitry, and the like. Accordingly, the apparatus 600 may be capable of performing other additional functions.

When implementing the functions of the components 212, 214, 216, 262, and 264, or the steps of the processes 400 or 500, multiple apparatuses having functions and structures similar to the apparatus 600 can be employed. For example, the functions of the local edge scheduler 262, and the edge monitoring agent 264 can be implemented with one apparatus, or can be distributed to multiple apparatuses. Similarly, the functions of the global edge scheduler 212, the global resource manager 214, the job manager 216 can be implemented with one apparatus, or distributed to multiple apparatuses. In various examples, the multiple apparatuses for implementing the components of the task scheduler 210 can be located within one data center, such as a remote central data center, or an edge computing center, or can be distributed within more than one data center.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware, but may also be distributed in other forms, such as via the Internet or other wired or wireless telecommunication systems. For example, the computer program can be obtained and loaded into an apparatus, such as the apparatus 600, including obtaining the computer program through physical medium or distributed system, including, for example, from a server connected to the Internet.

The computer program may be accessible from a computer-readable medium providing program instructions for use by or in connection with a computer or any instruction execution system. A computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium and solid state storage medium.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A computer-implemented method for dynamically allocating edge computing resources, comprising:
   receiving, in an edge computing center, a request from a task scheduler for using the edge computing resources to perform a secondary task for a secondary edge service;
   allocating the edge computing resources to the secondary edge service when the edge computing resources are available; and
   in response to an increase in a primary edge services workload, reallocating at least a portion of the edge computing resources from the secondary edge service to the primary edge services when the edge computing resources are insufficient for performing the primary edge services.

2. The method of claim 1, wherein detecting the increase in the primary edge services workload comprises receiving a message indicating the primary edge services workload has exceeded a workload threshold.

3. The method of claim 1, further comprising:
   monitoring the primary edge services workload of the edge computing resources; and
   providing information about the primary edge services workload to a task scheduler.

4. The method of claim 1, further comprising:
   providing edge context information of the edge computing center to a task scheduler.

5. The method of claim 1, wherein reallocating at least a portion of the edge computing resources from the secondary edge service to the primary edge services includes one of:
   aborting the secondary edge service,
   suspending the secondary edge service,
   reducing a number of virtual machines provisioned for the secondary service, or
   reducing a number of servers assigned for the secondary edge service.

6. The method of claim 1, wherein the edge computing resources in the edge computing center include a server, a container, a virtual machine, a main processor, a network, or a data storage.

7. A computer-implemented method in a task scheduler for dynamically allocating off-peak edge computing resources in a plurality of edge computing centers, comprising:
   receiving, a primary edge services workload from the plurality of edge computing centers, the primary edge services workload indicating edge computing resources being used for primary tasks;
   determining, based on the primary edge services workload, workload patterns of the edge computing resources indicating when the edge computing resources are in an off-peak state; and
   scheduling secondary tasks according to the workload patterns, and matching the secondary tasks to off-peak edge computing resources, the off-peak edge computing resources being in respective edge computing centers indicated by the workload patterns.

8. The method of claim 7, further comprising:
   receiving edge context information from the plurality of edge computing centers; and
   scheduling the secondary tasks according to edge contexts of the respective edge computing centers, the edge contexts specifying one or more of edge computing resource configurations of respective edge computing centers, edge computing center location information, or primary edge services supported at respective edge computing centers.

9. The method of claim 7, further comprising:
   scheduling the secondary tasks according to user subscription information.

10. The method of claim 7, further comprising:
    detecting a first edge computing resource in a first edge computing center is in the off-peak state based on the primary edge services workload of the first edge computing resource.

11. The method of claim 7, further comprising:
    partitioning a secondary task into sub-tasks such that the sub-tasks can fit in off-peak time slots indicated by the workload patterns of the edge computing resources; and
    generating a final result of the secondary task based on results of the sub-tasks.

12. The method of claim 7, further comprising:
    filtering out a secondary task that cannot fit in off-peak time slots indicated by the workload patterns of the edge computing resources.

13. The method of claim 7, further comprising:
    rescheduling a secondary task when the secondary task is rejected or aborted at an edge computing center.

14. The method of claim 7, wherein the edge computing resources include at least one of a server, a container, a virtual machine, a main processor, a network, or a data storage.

15. A non-transitory computer-readable medium storing computer instructions for a task scheduler dynamically allocating off-peak edge computing resources in a plurality of edge computing centers that, when executed by one or more processors, cause the one or more processors to:
    receive a primary edge services workload from the plurality of edge computing centers, the primary edge services workload indicating edge computing resources being used for primary tasks;
    determine, based on the primary edge services workload, workload patterns of the edge computing resources indicating when the edge computing resources are in an off-peak state; and
    schedule secondary tasks according to the workload patterns and match the secondary tasks to off-peak edge computing resources, the off-peak edge computing resources being in respective edge computing centers indicated by the workload patterns.

16. The non-transitory computer-readable medium of claim 15, wherein the steps further comprising:
    receive edge context information from the plurality of edge computing centers; and
    schedule the secondary tasks according to edge contexts of the respective edge computing centers, the edge contexts specifying one or more of edge computing resource configurations of respective edge computing centers, edge computing center location information, or primary edge services supported at respective edge computing centers.

17. The non-transitory computer-readable medium of claim 15, wherein the steps further comprising:

schedule the secondary tasks according to user subscription information.

18. The non-transitory computer-readable medium of claim 15, wherein the steps further comprising:
detect a first edge computing resource in a first edge computing center is in the off-peak state based on the primary edge services workload of the first edge computing resource.

19. The non-transitory computer-readable medium of claim 15, wherein the steps further comprising:
partition a secondary task into sub-tasks such that the sub-tasks can fit in off-peak time slots indicated by the workload patterns of the edge computing resources; and
generate a final result of the secondary task based on results of the sub-tasks.

20. The non-transitory computer-readable medium of claim 15, wherein the steps further comprising:
reschedule a secondary task when the secondary task is rejected or aborted at an edge computing center.

* * * * *

UNITED STATES PATENT AND TRADEMARK OFFICE
CERTIFICATE OF CORRECTION

PATENT NO. : 10,938,736 B2
APPLICATION NO. : 15/787203
DATED : March 2, 2021
INVENTOR(S) : Hui Guo et al.

Page 1 of 1

It is certified that error appears in the above-identified patent and that said Letters Patent is hereby corrected as shown below:

In the Claims

Column 17, Lines 30-46, Claims 3-5, should read:

3. The method of claim 1, further comprising:
    monitoring the primary edge services workload of the edge computing resources; and
    providing information about the primary edge services workload to the task scheduler.

4. The method of claim 1, further comprising:
    providing edge context information of the edge computing center to the task scheduler.

5. The method of claim 1, wherein reallocating at least a portion of the edge computing resources from the secondary edge service to the primary edge services includes one of:
    aborting the secondary edge service,
    suspending the secondary edge service,
    reducing a number of virtual machines provisioned for the secondary edge service, or
    reducing a number of servers assigned for the secondary edge service.

Signed and Sealed this
Twentieth Day of April, 2021

Drew Hirshfeld
*Performing the Functions and Duties of the
Under Secretary of Commerce for Intellectual Property and
Director of the United States Patent and Trademark Office*